United States Patent Office 3,296,094
Patented Jan. 3, 1967

3,296,094
STABILIZED AQUEOUS ENZYME SOLUTIONS
Theodore Cayle, Brooklyn, N.Y., assignor to Baxter Laboratories, Inc., Morton Grove, Ill., a corporation of Delaware
No Drawing. Filed May 5, 1966, Ser. No. 547,769
7 Claims. (Cl. 195—63)

This case is a continuation-in-part of co-pending application Serial No. 358,120, filed April 7, 1964, now abandoned.

The present invention relates to aqueous solutions of proteolytic enzymes which retain their proteolytic activity even after prolonged periods of storage. Such solutions are particularly suitable for use in various meat tenderization processes. More particularly, this invention is concerned with the proteolytic enzyme papain which is usually derived commercially from the unripe fruit of the tropical papaw or melon tree (Carica papaya).

It is generally recognized that papain gradually loses its proteolytic activity during storage, especially when it is in solution. This loss of activity is particularly pronounced in the case of dilute aqueous solutions (containing less than about 5% by weight of papain) such as are commonly employed for tenderizing meat. It has now been unexpectedly found, however, that dilute aqueous solutions of papain having good storage stability may be prepared by incorporating in such solutions certain quantities of glycerol and partially hydrolyzed and solubilized collagen.

As used herein, the term "partially hydrolyzed and solubilized collagen" refers to a protein material which is derived from collagen by degradation with any of the following: water, acid, alkali, heat, pressure, enzymes and the like, sufficient to make the collagen soluble or dispersible in water at about ordinary room temperature (about 25° C.) but without destroying the essential protein structure of the collagen. The partially hydrolyzed and solubilized collagen has a molecular weight substantially greater than the molecular weight range of the amino acids. In general, the molecular weight of the partially hydrolyzed and solubilized collagen is of the order of 10,000 to 100,000 or greater. A particularly suitable example of a partially hydrolyzed and solubilized collagen for use in the present invention is a material sold under the trademark "Sol-U-Pro" by United Chemical and Organic Products, Division of Wilson and Company, Inc.

The mechanism by which the glycerol and partially hydrolyzed and solubilized collagen coact to protect against the loss of activity in papain solutions is not precisely known, but the protein may be functioning in this capacity by virtue of its relationship as a potential substrate, and the glycerol may be functioning by virtue of its dehydrating characteristics. However, it will be understood that the invention defined herein is not limited to any particular theory.

In general, the proteolytic enzyme solutions of this invention can have a composition falling within the ranges set forth in the following table:

| Ingredient: | Wt. percent |
|---|---|
| Proteolytic enzyme | 0.05 to 3.0 |
| Glycerol | 35.0 to 60.0 |
| Partially hydrolyzed and solubilized collagen | 0.1 to 1.0 |
| Water | 36.0 to 64.0 |

It is preferable to also include in the proteolytic enzyme solutions of this invention a buffer system to maintain a pH of about 5.8–5.9. A phosphate buffer system is suitable for this purpose, and a mixture of di-basic and mono-basic phosphate in a molal ratio of 1:1 is preferred. The concentration of the buffer can be in the range of 0.01 to 0.5 weight percent.

Other ingredients may be added to the aforesaid solutions depending upon the use for which the solution is ultimately intended and provided that it has been determined that such ingredients have no deleterious effect upon storage stability. For example, in the case where the papain solution is intended for use in a meat tenderization process, the solution may include minor amounts of a salt of an amino acid, e.g., monosodium glutamate, which serves as a flavor enhancing agent. Usually, the amount of monosodium glutamate added to the solution should not exceed about 3% by weight as greater amounts appear to serve no useful purpose.

Since the proteolytic activity of papain is adversely affected by microbial contamination, it is usually desirable to add to the solution an agent which will effectively inhibit microbial growth. Sodium chloride is very effective for this purpose and it is usually added in amounts sufficient to saturate all of the water which is present in the solution.

In order to determine the proteolytic activity of the papain, the casein digestion test was employed. In this method, the samples of papain are mixed with a buffer solution (0.007% disodium phosphate, 0.014% disodium ethylenediaminetetra-acetate dihydrate, and 0.006% cysteine hydrochloride mono-hydrate—at pH of 6.0). Next 2 cc. of the sample solution are mixed with 5 cc. of 0.7% casein solution buffered to a pH of 6.0 with citric acid in a test tube and the mixture is heated in a bath at 40° C. for 60 minutes. Then 3 cc. of a 30% solution of trichloroacetic acid solution is added to the test tube and the resulting solution is reheated at 40° C. for 30 to 40 minutes. The contents of the test tube are then filtered and the optical density of the filtrate is measured at 280 mu. The activity of the sample is measured in tyrosine units as determined by the following formula:

$$10.96 \times O.D. \times D.F. = \text{tyrosine units/gm.}$$

where

O.D.=optical density of sample
D.F.=dilution factor of sample.

In referring to papain throughout this specification and claims, the papain is understood to have an average activity of 240,000 tyrosine units per gram. It is also understood that the concentration of enzyme employed is inversely proportional to its activity. For example, papain with one half the above-stated activity would be employed at twice the level indicated in the specification and claims.

*Example 1*

As an example of the preferred embodiment of the present invention in the case where the enzyme solution is ultimately destined for use in a meat tenderization process, the following composition has been found to give excellent results:

| Ingredient: | Wt. percent |
|---|---|
| Papain | 0.6 |
| Glycerol | 45.0 |
| Partially hydrolyzed and solubilized collagen [1] | 0.5 |
| Sodium chloride | 12.5 |
| Monosodium glutamate | 1.8 |
| Phosphate [2] | 0.1 |
| Water | 39.5 |

[1] Water soluble protein "Sol-U-Pro."
[2] A mixture of $Na_2HPO_4$ and $NaH_2PO_4$ in a molal ratio of 1:1.

*Example 2*

In order to compare the storage stability of the enzyme solution of Example 1 with the prior art solutions, a control solution was prepared having a composition identical to that given in Example 1 except that the glycerol and hydrolyzed collagen were omitted. Samples of both solutions were then stored under identical conditions at room temperature. At the end of ten days, the proteolytic activity of each solution was measured by the casein digestion method in which the degree of hydrolysis of the test samples is determined by optical denstiy measurement as explained above. It was found that the control solution had lost 78% of its original enzymatic activity whereas the solution made in accordance with this invention had retained 100% of its original activity. A further and later analysis of the solution of this invention at the end of sixty days of storage showed that it still retained 100% of its original proteolytic enzyme activity.

Substantially similar storage stability of aqueous solutions of proteolytic enzymes is obtained when equivalent amounts of ficin and bromelain are substituted for papain in the above example.

It will be apparent to those skilled in the art that many modifications of the illustrative examples given above may be made without departing from the spirit or scope of this invention and this application for Letters Patent is intended to cover all such modifications as would reasonably fall within the scope of the appended claims.

What is claimed is:

1. An aqueous solution of a proteolytic enzyme stabilized against loss of proteolytic activity upon storage comprising a proteolytic enzyme, glycerol and a partially hydrolyzed and solubilized collagen.

2. The aqueous solution of claim 1 in which the proteolytic enzyme is papain.

3. The aqueous solution of claim 2 in admixture with sodium chloride.

4. The aqueous solution of claim 2 in which the components are present in the following percentages by weight of said solution: about 0.05% to about 3.0% papain, about 35% to about 60% glycerol and about 0.1% to about 1.0% partially hydrolyzed and solubilized collagen.

5. The aqueous solution of claim 4 in admixture with phosphate buffer.

6. An aqueous solution of the proteolytic enzyme papain stabilized against loss of proteolytic activity upon storage having a composition within the following ranges:

| Ingredient: | Wt. percent |
|---|---|
| Papain | 0.05 to 3.0 |
| Glycerol | 35.0 to 60.0 |
| Partially hydrolyzed and solubilized collagen | 0.1 to 1.0 |
| Phosphate (a mixture of $Na_2HPO_4$ and $NaH_2HO_4$ in a molal ratio of 1:1) | 0.01 to 0.5 |
| Water | 36.0 to 64.0 |

7. An aqueous solution of the proteolytic enzyme papain stabilized against loss of proteolytic activity upon storage and which is particularly adapted for use in meat tenderization processes having a composition consisting essentially as follows:

| Ingredient: | Wt. percent |
|---|---|
| Papain | 0.6 |
| Glycerol | 45.0 |
| Partially hydrolyzed and solubilized collagen | 0.5 |
| Sodium chloride | 12.5 |
| Monosodium glutamate | 1.8 |
| Phosphate (a mixture of $Na_2HPO_4$ and $NaH_2PO_4$ in a molal ratio of 1:1) | 0.1 |
| Water | 39.5 |

References Cited by the Examiner

UNITED STATES PATENTS

| 2,995,493 | 8/1961 | Douglas et al. | 195—63 X |
| 3,019,171 | 1/1962 | Bloch et al. | 195—68 |
| 3,050,445 | 8/1962 | Damaskus et al. | 195—63 |
| 3,051,627 | 8/1962 | Bradford et al. | 195—63 |

A. LOUIS MONACELL, *Primary Examiner.*

L. M. SHAPIRO, *Assistant Examiner.*